United States Patent

Ecochard

[11] Patent Number: 5,916,622
[45] Date of Patent: Jun. 29, 1999

[54] METHOD OF PRODUCING A CHICORY-BASED PRODUCT

[75] Inventor: Claude Ecochard, Faches Thumesnil, France

[73] Assignee: Leroux S.A., Orchies, France

[21] Appl. No.: 09/007,259

[22] Filed: Jan. 14, 1998

[30] Foreign Application Priority Data

Jan. 14, 1997 [FR] France .................................. 97 00503

[51] Int. Cl.⁶ ........................................................ A23F 5/00
[52] U.S. Cl. ........................... 426/596; 426/454; 426/453; 426/594
[58] Field of Search .................................. 426/454, 596, 426/453, 594

[56] References Cited

U.S. PATENT DOCUMENTS

| 3,071,470 | 1/1963 | Bishop . |
| 3,615,670 | 10/1971 | Sienkiewicz . |
| 4,154,864 | 5/1979 | Risler et al. . |
| 4,840,809 | 6/1989 | Hsu . |

FOREIGN PATENT DOCUMENTS

| 767 040 | 10/1971 | Belgium . |
| 204 256 | 12/1986 | European Pat. Off. . |
| 207 384 | 1/1987 | European Pat. Off. . |
| 331 222 | 9/1989 | European Pat. Off. . |
| 373 697 | 6/1990 | European Pat. Off. . |
| 2 064 353 | 7/1971 | France . |
| 24 11 323 | 9/1975 | Germany . |

*Primary Examiner*—Anthony J. Weier
*Attorney, Agent, or Firm*—Wolf, Greenfield & Sacks, P.C.

[57] ABSTRACT

The method of the invention is charecterized by preparing a layer of a foodstuff, without prior moistening, which foodstuff is in the form of a soluble powder based either on chicory alone or on a mixture containing at least one-third by weight of chicory, in raising the layer in ambient air to a temperature that is sufficient for surface melting the chicory powder, and then in cooling it. After the cooling operation, the resulting layer of agglomerating powder can be crushed, ground, and screened in order to obtain a product in granular form, preferably having grain size lying in the range 0.5 mm to 3 mm. The layer of powder may also be placed in a mold so as to obtain a product in the form of a compact slab of agglomerated powder whose outside shape matches that of the mold.

9 Claims, 1 Drawing Sheet

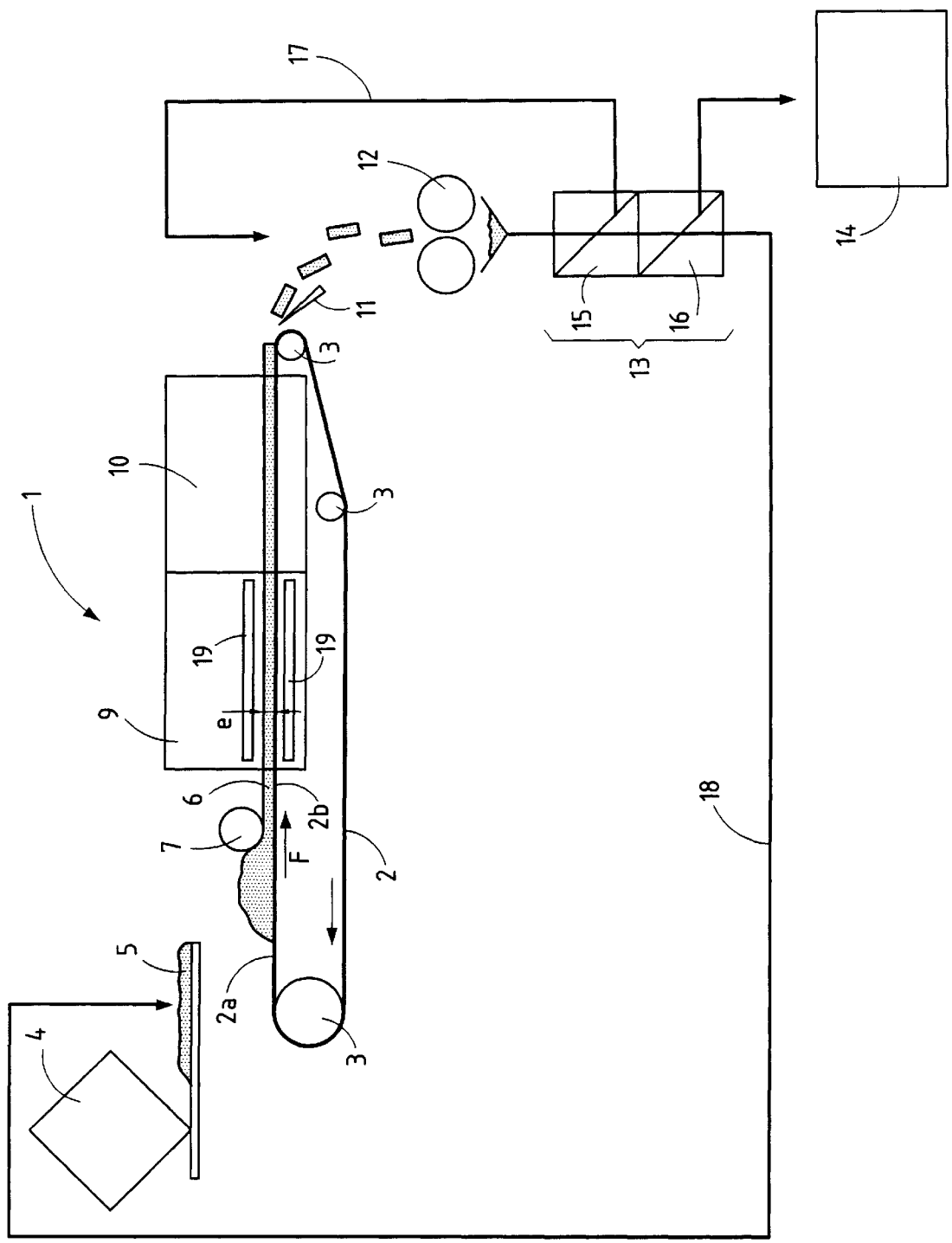

METHOD OF PRODUCING A CHICORY-BASED PRODUCT

The present invention relates to producing a food product in granular form based on chicory, either pure or in a mixture.

BACKGROUND OF THE INVENTION

Chicory is a herbaceous plant. A species of chicory has a root which, when roasted, can produce a substance that has for a long time been considered as a substitute for coffee, and which is also known as "chicory".

Such chicory is presently available in granular form or in powder form. Non-soluble grains are obtained by crushing the chicory root after it has been dried and then roasted. The soluble powder is obtained by atomizing the aqueous extract of chicory.

Soluble coffee has been in existence for a very long time in a granular form in which particles of powder are agglomerated so as to form granules that are larger in size and more homogeneous. That presentation has significant advantages such as improved wettability and is thus more "instant". Presentation in granular form also facilitates flow, transport, storage, and measuring out of the product.

Granularization or agglomerization of soluble coffee powder has been known and used for several tens of years. In particular, in document FR 1 513 730, particles of coffee are wetted in order to make them sticky and they are put into contact in order to form agglomerates, after which water is added in sufficient quantity to lower the softening point of the coffee at its points of contact to a temperature that is sufficient for said points of contact to dissolve; finally, the agglomerates are heated above the softening point so as to melt the particles and dry them. Agglomeration is thus the result firstly of wetting and secondly of localized fusion of coffee particles.

Other techniques have been developed, in particular in document EP 420 509, all of which moisten particles of soluble coffee powders.

The above-mentioned techniques cannot be transposed to soluble chicory powder, since as the presence of moisture leads to an unusable paste being formed. According to the Applicant, this is due to chicory being very hygroscopic due to its high fructose content.

It is thus possible to envisage implementing the above-mentioned techniques of moistening and heating to obtain a chicory-based product in granular form, but only when providing the chicory powder as a small fraction of a mixture with soluble coffee powder, or providing the chicory powder subjected to prior treatment for reducing its fructose content by a significant amount.

Document EP 373 697 proposes avoiding prior moistening of powder particles by performing the heating in a closed environment. In the method described, it is essential to operate in a closed environment so as to retain all of the water content inherent to the powder extract in order to achieve agglomeration. The presence of water, whether by prior moistening or by conserving the natural water content of the powder, is still considered as being essential during heating in order to achieve the looked-for agglomeration.

Document EP 373 697 mentions chicory, but does not give any example relating to this substance. The Applicant has observed that performing agglomeration in a closed environment, without prior moistening, and using chicory in accordance with the teaching of document EP 373 697 leads to an agglomerated product which is not homogeneous, having significant loss of porosity in its surface zone while on the contrary being highly friable in the core of the product. Such non-uniformity makes the agglomerated product completely unsuitable for subsequent crushing and grinding to make granules.

There is another technique for making granules by means of a dry process, implementing high pressure, the powder being agglomerated between two plates, optionally provided with recesses. The slab of powder compressed in this way is subsequently crushed and screened to obtain granules. With soluble chicory powder, that technique using compression leads to an agglomerate that is compact, very dense, and poorly soluble.

OBJECT AND SUMMARY OF THE INVENTION

The object of the Applicant is to propose a method of production that makes it possible to obtain a product based on chicory that is pure or at high concentration, which product is in the form of granules of soluble powder and in which the chicory retains its initial fructose content, while mitigating the above-mentioned drawbacks of the method described in document EP 373 697.

This object is fully achieved by the method of the invention, which is characterized by a method for preparing, without prior moistening, a layer of foodstuff in the form of a soluble powder, based either on chicory alone or on a mixture having at least one-third by weight of chicory, in raising said layer in ambient air to a temperature that is sufficient to achieve surface melting of the chicory powder, and then in cooling it.

Under the effect of temperature, the particles of soluble chicory melt superficially and, because they are disposed in a layer, the particles stick to one another in their zones of contact, with such adhesion being definitive after the layer has been cooled. It will be understood that to achieve this inter-particle bonding, it is necessary for the temperature rise to take place while the particles are indeed in contact with one another. When the layer of foodstuff is a mixture, the chicory particles act as a binder if the powder of the other foodstuff(s) used in the mixture does not melt or has a melting temperature higher than that of chicory powder. The mixture in question must thus be sufficiently homogeneous and the quantity of soluble chicory must be sufficient to obtain such adhesion between all of the particles in order to enable a layer of agglomerated powder to be made.

The fact of working in ambient air, and not in a closed environment as in document EP 373 697, means that air flows through the layer of powder both during heating and during cooling, thereby making it possible to take best advantage of the thermoplastic character of soluble chicory powder and to obtain uniform treatment of the layer.

In a first variant implementation, after the cooling operation, the resulting layer of agglomerated powder is crushed, ground, and screened so as to obtain a product in the form of granules.

In a second variant implementation, the layer of powder is placed in a mold to obtain a product in the form of a compact slab of agglomerated powder having the outside shape of the mold.

The production method of the invention is preferably a continuous method, the layer of foodstuff being moved past heater means, in particular means using preferably long-wave infrared radiation or means that circulate hot air under laminar conditions, and then past cooling means, in particular means that circulate cooling air under laminar conditions.

In particular, when the layer is a layer of soluble chicory powder of thickness lying in the range 5 mm to 20 mm, it is raised to a temperature of about 95° C. and cooling is performed by circulating a flow of dry air at a temperature lying in the range 20° C. to 25° C.

BRIEF DESCRIPTION OF THE DRAWING

The present invention will be better understood on reading the following description of two implementations of the method of the invention relating to producing a product based on chicory in the form of granules in the first case and in the form of a soluble compact slab in the second case, which method is illustrated in the accompanying drawing in which the sole figure is a simplified diagram of an installation for producing the product in granular form.

MORE DETAILED DESCRIPTION

The general principle of the invention is charecterized by agglomerating particles of soluble chicory powder, on their own or mixed with other soluble powder particles of other foodstuff ingredients, by making use of the thermofusible nature of chicory, without adding moisture, without using the residual water content of the powder particles, and without changing the fructose content of the chicory. For such agglomeration to take place, it is necessary firstly for the particles of soluble chicory to be raised to a temperature that is sufficient to obtain surface melting thereof, which temperature is generally about 95° C., and secondly for this rise in temperature to be performed while the particles are in ambient air and in contact with one another, being in the form of a layer of powder.

It should be emphasized that, at the above-mentioned surface melting temperature of soluble chicory particles, the Applicant has been able to observe that there is no spoiling of the physico-chemical characteristics nor of the drinking qualities specific to chicory.

This general concept can lead to products in two different forms, already known for other foodstuffs but not for chicory, namely in the form of soluble granules, and in the form of a compact soluble slab.

The first example described below concerns presentation in the form of granules.

The product in question is made in an installation as shown in simplified diagrammatic form in FIG. 1.

The installation includes a conveyor belt 2 that moves in translation in the direction of arrow F, being mounted in the form of a loop over deflection rollers 3, at least one of which is driven in rotation by appropriate means.

A feeder device 4 is located above the top run 2a of the conveyor belt 2, near the upstream end of said run 2a relative to the displacement direction thereof. The feeder device 4 may comprise, in particular, a vibrating tipper and serves to place a certain quantity of soluble chicory powder 5 on the top run 2a of the belt 2 so as to form a layer 6 of determined thickness e, e.g. of the order of 5 mm.

A cylinder 7 or a guillotine, positioned accurately over the top run 2a of the belt 2 serves to provide fine adjustment of the thickness e of the layer 6.

The installation 1 also includes a heating station 9 and a cooling station 10 located one after the other in association with the belt 2 downstream from the feeder device 4, and possibly downstream from the thickness-adjusting cylinder 7.

The heating station 9 is defined to raise the layer 6 to a temperature which is just high enough to obtain surface melting of the particles constituting the layer 6 throughout its thickness e. This temperature is normally about 95° C. It may possibly vary as a function of the origin of the chicory, the size of the particles, the residual moisture content of the particles, . . . .

The heater means implemented in the station 9 must under no circumstances disturb the disposition of the soluble chicory powder in the form of a layer. In a first variant, this can be achieved by infrared heating, and more particularly by heating using long-wave infrared radiation, i.e. having a wavelength $\lambda$ lying in the range 4 $\mu$m to 10 $\mu$m. In a specific but non-limiting example, long-wave infrared emitters 19 are disposed on either side of the layer 6 of powder at a distance of 5 cm above and below it, so as to obtain completely uniform agglomeration. Under such circumstances, the belt 2 is made of dark material that absorbs infrared radiation, e.g. a metal strip having a bottom face 2b that is of a dark color. The power of the emitters is determined to obtain complete and uniform agglomeration of the powder in a transit time of about 90 seconds.

This can also be achieved by heating using hot air circulation, it being understood that the flow of air passing through the layer must correspond to flow under laminar conditions so as to avoid disturbing the layer 6 of particles. Complete and uniform agglomeration is obtained with a circulation of hot air at 95° C. for a transit time of the order of 600 seconds.

The function of the cooling station 10 is to lower the temperature of the layer 6 to about 25° C.; the means implemented may act, in particular, by circulating air that is cold and dry, likewise under laminar conditions, and passing through the layer.

At the outlet from the conveyor belt 2, the installation 1 further includes a scraper blade 11, and below the blade a grinder device 12 followed by a screening device 13 and a device 14 for recovering and storing the granular product.

In the example shown, the screening device 13 comprises two successive screens having openings of sizes that correspond to an acceptable range of grain sizes for the granulated product.

Finally, the installation 1 includes two recycling systems 17 and 18, with the first system 17 recycling granules retained by the first screen 15 via the grinder 12 since such granules are of grain size that is too large, and with the second system 18 recycling granules that have passed through the second screen 16, i.e. granules of grain size that is too small, back to the feeder device 4.

In a specific implementation, the screens 15 and 16 have openings of sizes 3 mm and 0.5 mm, respectively.

The granulated product having grain sizes lying in the range 0.5 mm to 3 mm is a soluble product, 100% chicory, and its drinking qualities are unspoilt. When the granulated product is dispersed in a hot liquid, the granulated product is dissolved immediately, unlike what happens when the product is in the form of soluble chicory powder. With a powder, a hydrophobic surface layer forms, thereby preventing water from penetrating, whereas with the granulated product of the invention, the air which is included in the array of agglomerated powder particles allows the water to penetrate by capillarity into the insides of the granules, and thus render the product soluble.

The above applies to pure soluble chicory, but it is also true for a mixture of chicory powder with other foodstuff ingredients in powder form. It is preferable for the particles of the other foodstuff ingredient(s) of the mixture to be of substantially the same size and density as the particles of chicory, so as to obtain a homogeneous mixture of the various components under good conditions. Unless the additional ingredients are also somewhat plastic at the temperature implemented in the heating station 9, it is only the particles of soluble chicory that act as a binder between all of the particles in the mixture. To ensure that the layer 6 is in compact form at the outlet from the conveyor belt 2 so as to be suitable for being broken up into large lumps by the scraper blade 11 and then ground in the grinding station 12, it is necessary for the points of contact between the particles of soluble chicory and the other particles to be sufficient in terms of quantity and of quality to obtain a single three-dimensional array.

Such an array has been obtained in satisfactory manner with a mixture including at least one-third particles of soluble chicory, the other particles being of a size and a density that are of the same order as those of particles of soluble chicory. This applies in particular to soluble coffee powder. It should be recalled that soluble chicory in powder form has a grain size of the order of 250 micrometers.

In a second implementation, the product is not a granulated product, but is a chicory-based product in the form of a compact soluble slab.

Such a product is obtained in an installation which, like the installation 1 above, comprises a feeder device 5, a conveyor belt 2, and heating and cooling stations 9 and 10.

On the belt 2, or possibly integrated in the conveying strip of the belt 2, there are provided mold-forming cavities in which layers of chicory powder are placed, either in pure or mixed form as above. At the outlet from the cooling station 10, each cavity contains a compact slab of agglomerated powder, having the outside shape of the cavity and the thickness e of the layer.

At the outlet from the conveyor belt, the slabs can be recovered, either in bulk or else individually in order to be wrapped.

Such wrapping can be constituted by packaging having one or more cavities placed at the inlet end of the conveyor belt and covered at the outlet from the conveyor belt by a capsule-forming sheet of plastic.

The invention thus makes it possible to obtain soluble chicory in a presentation that is similar to lump sugar in the form of rectangular parallelepipeds.

I claim:

1. A method of producing a soluble food product based on chicory, the method comprising
    preparing, without prior moistening, a layer of foodstuff in form of a soluble powder including at least one-third by weight of chicory particles,
    raising said layer in ambient air to a temperature that is sufficient to achieve surface melting of said chicory particles, and then cooling said layer, wherien said method is performed without adding moisture.

2. A method according to claim 1, wherein the powder includes another foodstuff made of particles of a size and a density being approximately similar to a size and density of the particles of chicory.

3. A method according to claim 1, further including after the cooling, crushing, grinding and screening the layer to obtain a product in a form of granules.

4. A method according to claim 1, wherein said preparing includes placing the layer of powder foodstuff in a mold to obtain a product in a form of a compact slab of agglomerated powder having an outside shape of the mold.

5. A method according to claim 1, wherein said raising includes moving the powder past a heating system for a sufficient length of time to obtain complete and uniform agglomeration of the layer, and then past a cooling system making use of cooling air circulating under laminar conditions through the layer.

6. A method according to claim 5, wherein the heating system includes emitters of long-wave infrared radiation disposed above and below the layer of powder, which is supported on a strip of dark material that absorbs the infrared radiation.

7. A method according to claim 5, wherein the heating system includes means for circulating hot air at about 95° C. under laminar conditions through the layer.

8. A method according to claim 5, wherein said preparing includes providing said layer having a thickness in a range 5 mm to 20 mm, said raising includes heating said layer to a temperature of about 95° C., and said cooling includes providing a flow of dry air circulating at a temperature lying in a range 20° C. to 25° C.

9. A method according to claim 1 performed without changing a fructose content of said chicory particles.

\* \* \* \* \*